United States Patent
Hsu

(10) Patent No.: US 10,652,660 B2
(45) Date of Patent: May 12, 2020

(54) DATA PACKET COMPENSATION IN MULTI-DEVICE MEDIA SYSTEMS

(71) Applicant: Microchip Technology Incorporated, Chandler, AZ (US)

(72) Inventor: Shu Hao Hsu, Zhubei (TW)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/692,725

(22) Filed: Nov. 22, 2019

(65) Prior Publication Data

US 2020/0092651 A1 Mar. 19, 2020

Related U.S. Application Data

(63) Continuation of application No. 16/102,296, filed on Aug. 13, 2018, now Pat. No. 10,492,001.

(60) Provisional application No. 62/669,869, filed on May 10, 2018.

(51) Int. Cl.
  *H04R 5/033* (2006.01)
  *H04L 12/26* (2006.01)
  *H04R 3/00* (2006.01)

(52) U.S. Cl.
  CPC .......... *H04R 5/033* (2013.01); *H04L 43/065* (2013.01); *H04L 43/0835* (2013.01); *H04R 3/00* (2013.01); *H04R 2420/07* (2013.01)

(58) Field of Classification Search
  CPC ...... H04R 5/033; H04R 3/00; H04R 2420/07; H04L 43/065; H04L 43/0835
  See application file for complete search history.

(56) References Cited

U.S. PATENT DOCUMENTS

| | | |
|---|---|---|
| 8,768,252 B2 | 7/2014 | Watson et al. |
| 10,244,307 B1 | 3/2019 | Tong et al. |
| 2012/0155670 A1 | 6/2012 | Rutschman |
| 2016/0194538 A1 | 7/2016 | Mizoguchi et al. |

(Continued)

FOREIGN PATENT DOCUMENTS

| | | |
|---|---|---|
| CN | 107018484 A | 8/2017 |
| EP | 1715718 A2 | 10/2006 |

OTHER PUBLICATIONS

International Search Report for International Application No. PCT/US2019/029220, dated Jul. 22, 2019, 5 pages.

(Continued)

*Primary Examiner* — Regina N Holder
(74) *Attorney, Agent, or Firm* — TraskBritt

(57) ABSTRACT

Various embodiments relate to data packet compensation in multi-device media systems. A primary headphone device may include one or more communication interfaces configured to communicate with an audio source and a secondary headphone device. The primary headphone device may further include communication logic configured to transmit information to the secondary headphone device identifying one or more data packets received by the primary headphone device. The communication logic may also be configured to receive reporting information identifying one or more data packets missed by the secondary headphone device. Also, the communication logic may be configured to transmit compensation information for the one or more data packets missed by the secondary headphone device.

20 Claims, 8 Drawing Sheets

(56) References Cited

U.S. PATENT DOCUMENTS

2018/0176717 A1* 6/2018 Fu .......................... H04W 4/80
2018/0317126 A1* 11/2018 Wang ..................... H04W 4/80

OTHER PUBLICATIONS

International Written Opinion for International Application No. PCT/US2019/029220, dated Jul. 22, 2019, 9 pages.

* cited by examiner

DATA PACKET COMPENSATION IN MULTI-DEVICE MEDIA SYSTEMS

CROSS-REFERENCE TO RELATED APPLICATIONS

This application is a continuation of U.S. patent application Ser. No. 16/102,296, filed Aug. 13, 2018, now U.S. Pat. No. 10,492,001, issued on Nov. 26, 2019, the disclosure of which is hereby incorporated herein in its entirety by this reference. A claim for benefit of priority to the May 10, 2018 filing date of the U.S. Patent Provisional Application No. 62/669,869, titled "SYSTEMS, METHODS AND DEVICES FOR COMPENSATING FOR MISSED DATA PACKETS, AND OTHER RELATED SYSTEMS, METHODS, AND DEVICES" (the '869 Provisional Application), is hereby made pursuant to 35 U.S.C. § 119(e). The entire disclosure of the '869 Provisional Application is hereby incorporated herein.

TECHNICAL FIELD

The embodiments described herein relate, generally, to communicating data packets, and more specifically, to data packet compensation in multi-device media systems. Yet more specifically, various embodiments relate to compensating for failing to capture wirelessly transmitted data packets in multi-speaker audio systems.

BACKGROUND

Media (e.g. audio) may be wirelessly streamed from a media source (e.g., a mobile phone, a personal computer, a media device, a set-top device, etc.) to headphones and/or speakers, where the media is played. One conventional arrangement known to the inventors of this disclosure is a relay system. In a multi-device relay system, a primary device (e.g., a primary speaker) may wirelessly connect to and receive audio packets from an audio source. Further, the primary device may implement a relay and send the received audio packets to a secondary device (e.g. a secondary speaker) via, for example, a BLUETOOTH® connection. Upon receipt of the audio packets, the secondary device may decode and play the audio packets sent from the primary device.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
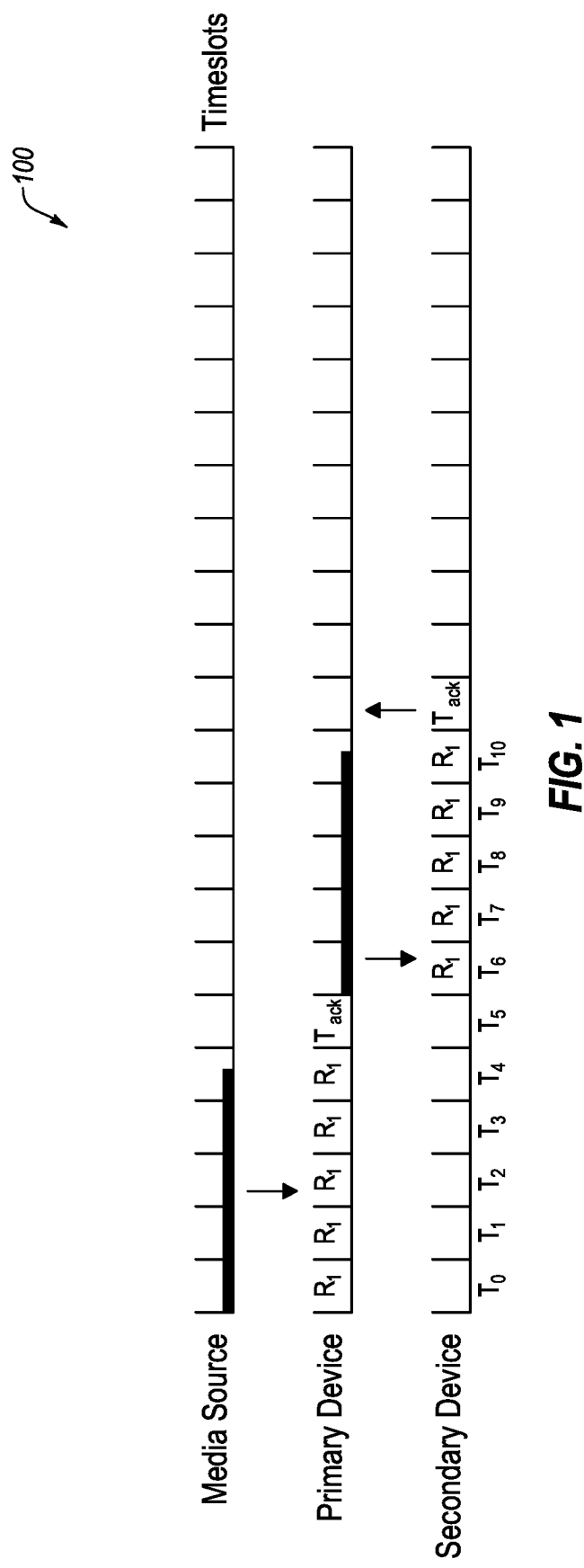
FIG. 1 is a timing diagram for a multi-device relay system.

Various embodiments disclosed herein are related to compensating for failing to capture wirelessly transmitted data packets in multi-speaker audio systems. In some embodiments are primary device, such as a primary speaker, may receive data packets (e.g., audio packets) transmitted from a media source via a first communication link (e.g., a wireless communication link). Further, a secondary device, such as a secondary speaker, may capture ("sniff") the data packets transmitted from the media source to the primary device. Further, any data packets transmitted by the media source and missed by the secondary device may be identified (e.g., via the primary device and/or the secondary device) and transmitted from the primary device to the secondary device via a second communication link (e.g., a wireless communication link).

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that various embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, the term "sniffing" may refer to capturing data packets transmitted over one or more wired or wireless communication links and/or networks. Data packet capture may be performed by intercepting and copying the data packets or select contents of the data packets. A "sniffer" may include software that performs sniffing, and a sniffer may operate in conjunction with, or be incorporated with, modems, radios, transceivers, or other communication and networking equipment. Sniffers may include protocol analyzers to enable the sniffers to listen to analyze communication protocols used on a communication channel. A sniffer may listen to one or more channels of a wireless communication. For example, if a sniffer operates at a host computer, or with communication equipment that has multiple wireless interfaces, the sniffer may use the interfaces to perform multichannel capture. Further, as used herein, "missed data packet" means a data packet that is either not captured or that is captured but is not complete, is corrupt, or has some other characteristic or quality that renders it unusable or not easily useable.

Moreover, as used in this disclosure, "wireless communication link" means a physical communication channel between two devices where the physical medium of communication is primarily radio-frequency (RF) waves. For example, a channel of a wireless communication link may be a frequency-specific communication path between the two devices. A channel may be part of a frequency spectrum allocated for communication that is comprised of many possible channels. A wireless communication link may use multiple channels within a frequency spectrum during communication between two devices, for example, using techniques such as frequency hopping and adaptive frequency hopping. A wireless communication link may be unidirectional or bidirectional. As used in this disclosure, "communication message(s)" means the administrative messages (e.g., for setup of a wireless communication link) and/or the information messages (e.g., data payload) sent over a wireless communication link as one or more data packets.

In a multi-speaker audio system, a power imbalance may exist between two speakers of the audio system due to a primary speaker powering two connections (e.g., one with the audio source and another with one or more other, secondary speakers). Moreover, in a multi-device audio system (e.g., a headphone system), there is a high probability of audio packet loss (e.g., due to the duration of audio packets). Further, in a headphone system including two earpieces, a human head may interfere with wireless signals (especially 2.4 MHz signals) transmitted between a primary earpiece and a secondary earpiece. One conventional technique to compensate for interference is to boost the power of the primary earpiece, however this may further exacerbate the power imbalance between the primary earpiece and the secondary earpiece.

As described herein, in conventional multi-device relay systems, because a primary device (e.g., a primary headset) is required to relay received packets to a secondary device (e.g., a secondary headset), the primary device may be required to use twice as many timeslots to handle a relay function compared to a system including a single device (e.g., a single headset). FIG. 1 depicts a timing diagram 100 for a relay system. As shown in FIG. 1, a media source may transmit data packets to a primary device during a first time duration (e.g., timeslots $T_0$-$T_4$). Further, the primary device may relay the received packets to a secondary device during a second, subsequent time duration (e.g., during timeslots $T_6$-$T_{10}$).

According to various embodiments of the present disclosure, a multi-device media system may include a media source (e.g., an audio source), a primary device (e.g., a master device) and one or more secondary devices (e.g., one or more slave devices). For example, a primary or master device may include a primary transducer, such as a primary speaker, a primary headphone, a primary earphone, a primary earbud, etc. Further, for example, a secondary or slave device may include a secondary transducer, such as a secondary speaker, a secondary headphone, a secondary earphone, a secondary earbud, etc. As a non-limiting example, the media source may include an audio source, such as a mobile phone.

In some embodiments, the primary device may be coupled to the media source via a wireless communication link (e.g., unidirectional or bidirectional communication link), such as a BLUETOOTH® communication link a ZIGBEE® communication link, a Z-Wave communication link, or any other suitable communication link. Further, in some embodiments, a secondary device may be coupled to the primary device via a wireless communication link (e.g., unidirectional or bidirectional communication link). For example, the secondary device may be coupled to the primary device via a BLUETOOTH® communication link, a ZIGBEE® communication link, a Z-Wave communication link, or any other suitable communication link. Further, as described more fully herein, the one or more secondary devices may be configured for capturing "sniffing" data packets (e.g., audio packets) transmitted from the audio source to the primary device. Moreover, according to various embodiments, the primary device and/or the secondary device may be configured to determine which data pickets, if any, sent from the media source to the primary device, were not captured by the secondary device. Stated another way, the primary device and/or the secondary device may be configured to determine if the secondary device missed any data packets and, if so, which data packets were missed by the secondary device.

Further, according to various embodiments, responsive to identification of one or more missed data packets (e.g., via the primary device and/or the second device), the primary device may transmit a reply to the second device, via the second communication link, wherein the reply may include compensation information. The compensation information may include, for example, identification of the one or more missed data packets, the one or more missed data packets, and/or content (e.g., media content) related to the one or more data missed packets. In some embodiments, the missed data packets are transmitted from the primary device to the second device. Upon receipt of the missed data packets, and before the missed data packets are decoded and played, the secondary device may associate each missed data packet with a previously unassociated time slot.

One of ordinary skill in the art will recognize that the embodiments of the disclosure have many advantages, including, but not limited to, remedying the deficiencies inherent in a relay system, such as requirements related to, for example, power consumption and bandwidth. For example, because the secondary device primarily relies on the sniffer to capture audio packets, and the primary device is not required to relay all received data packets to the secondary devices, various embodiments may provide significant power savings. Also, various embodiments may reduce bandwidth requirements in contrast to a relay system, which requires that one device receive data packets over a first communication link and then transmit the received data packets to the other device over a second communication link. In both interference environments (e.g., including a human head) and non-interference environments, embodiments of the disclosure may experience bandwidth savings compared to the relay system.

Accordingly, various embodiments described in this disclosure set forth a technical solution to a technological problem with respect to data packet compensation. The technological problem outlined herein regarding data packet transmission did not exist before computer technology and is directly related to computer technology. The various embodiments described herein set forth a technical solution to the technical problem that requires implementation by a computer or computer system. The technical solution may include, for example, compensating for failing to capture wirelessly transmitted data packets in multi-speaker audio systems. Alternatively or additionally, the systems and methods described in this disclosure may solve other technological problems and provide other technical solutions.

Furthermore, the systems and methods described in this disclosure are at least in the technological field of wireless communication, in particular the technological field with respect to data packet transmission in multi-device media systems. The systems and methods described in this disclosure may be relevant and useful in other technological fields as well.

Figure 2:
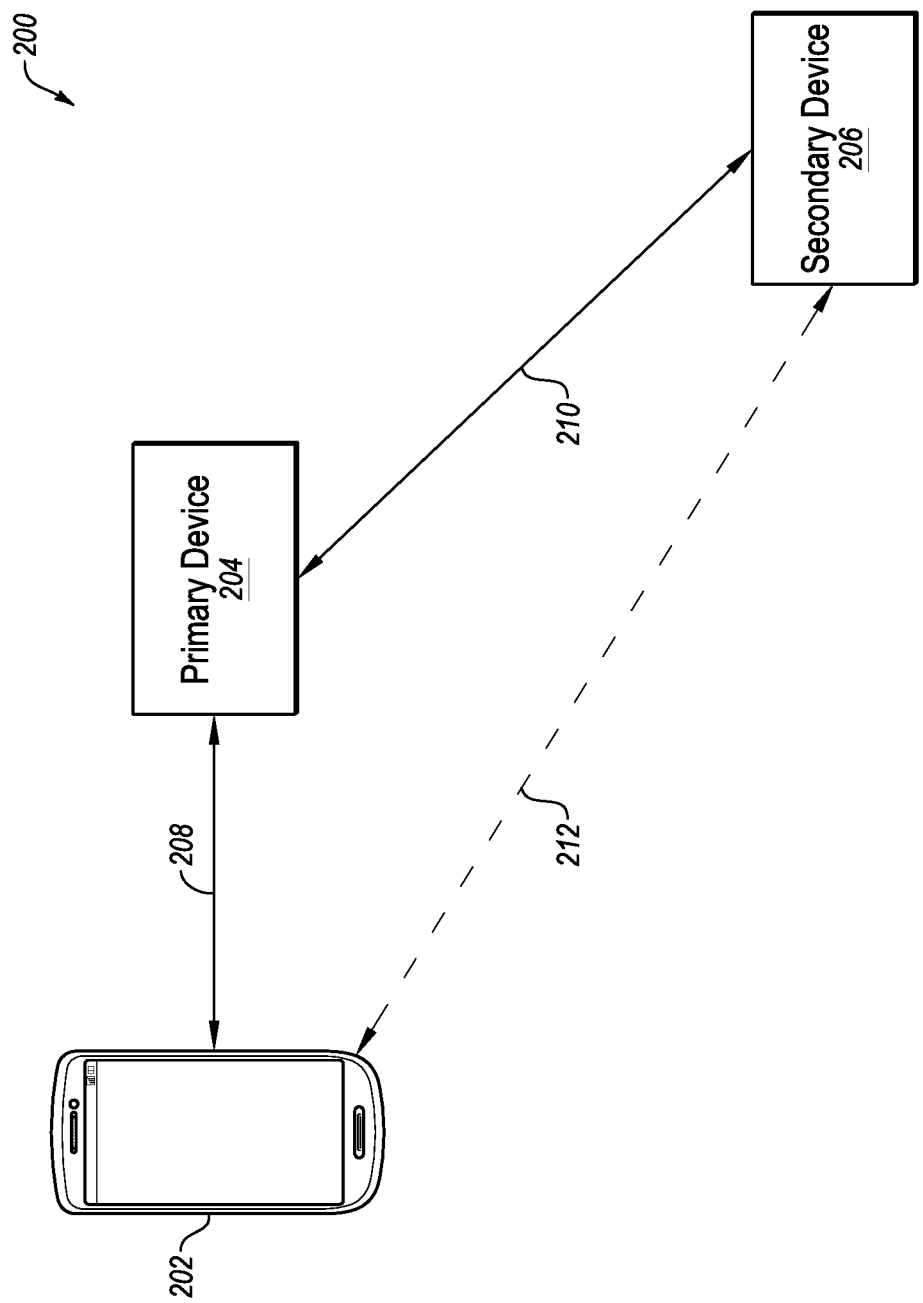
FIG. 2 illustrates an example multi-device media system including a media source, a primary device, and a secondary device, in accordance with various embodiments of the disclosure.

FIG. 2 illustrates an example multi-device media system 200 configured to compensate for missed packets, according to various embodiments of the disclosure. Multi-device media systems 200 includes a media source 202, a primary headset 204, and a secondary headset 206. For description purposes only, and not by way of limitation, multi-device media system 200 may also be referred to herein as a "multi-speaker system" and may include a plurality of headsets. Thus, in this example, primary device 204 may also be referred to herein as "primary headset" and secondary device 206 may also be referred to herein as "secondary headset."

Media source 202 may include, for example, a mobile phone with a BLUETOOTH® audio functionality. According to various embodiments, primary headset 204 may be configured to communicate with media source 202 via a first communication link 208 (e.g., a wireless communication link) and secondary headset 206 via a second communication link 210 (e.g., a wireless communication link). In at least one embodiment, during or after pairing of the primary and secondary headsets, secondary headset 206 may receive setup information from primary headset 204. In other embodiments, secondary headset 206 may receive setup information from media source 202. For example, the setup information may enable secondary headset 206 to listen to messages (e.g., air packets) that are communicated between media source 202 and primary headset 204. Thus, in some embodiments, secondary headset 206 may implement a listening function (e.g., via a sniffer), and may be configured to capture communication packets wirelessly transmitted from media source 202 to primary headset 204. Further, in some embodiments, secondary headset 206 may be configured to communicate with media source 202 via communication link 212. Alternatively or additionally, secondary headset 206 may be configured to communicate with media source 202 via second communication link 210, primary headset 204, and first communication link 208. For example, secondary headset 206 may send identification information to media source 202 (e.g., secondary headset may identify itself to media source 202). Further, in some embodiments, secondary headset 206 may notify media source 202 of its intent to sniff transmissions sent from media source 202 to primary headset 204.

Further, according to various embodiments, both primary headset 204 and secondary headset 206 may communicate with each other to identify data packets transmitted by media source 202 and missed by secondary headset 206. Stated another, any data packets that were transmitted by media source 202 and not captured by secondary headset 206 may be identified via primary headset 204 and/or secondary headset 206, as described more fully herein. Further, any identified missed data packets may be transmitted from primary headset 204 to secondary headset 206, which may assign the previously missed data packets to appropriate timeslots.

For example, if data packets X, Y, and Z were sent from media source 202 to primary headset 204, but secondary headset 206 only captured data packets X and Z, multi-device media system 200 may determine secondary headset 206 failed to capture data packet Y. More specifically, for example, in some embodiments, secondary headset 206 may report to primary headset 204 to identify which data packets were captured by secondary headset 206 (i.e., in this example packets X and Z). In these embodiments, primary headset 204 may compare the data packets it received from media source 202 (i.e., data packets X, Y, and Z) to the data packets captured by secondary headset 206 (i.e., packets X and Z) to identify which data packets, if any, secondary headset 206 failed to capture. Further, in some embodiments, primary headset 204 may send one or more messages to secondary headset 206 indicating whether or not secondary headset 206 missed any data packets, and, if one or more data packets were missed, the one or more messages sent from primary headset 204 to secondary headset 206 may identify the one or more missed data packets. For example, primary headset 204 may send one or more messages to secondary headset 206 indicating that secondary headset 206 failed to capture data packet Y. Further, in this example, primary headset 204 may transmit data packet Y to secondary headset 206.

In other embodiments, primary headset 204 may send a list of data packets (e.g., a list identifying data packets X, Y, and Z) it received from media source 202 to secondary headset 206, and secondary headset 206 may compare the data packets received by primary headset 204 to the data packets captured (e.g., data packets X and Z) by secondary headset 206. In these embodiments, in response to the comparison, secondary headset 206 may report to primary headset 204 and identify which packets, if any, secondary headset 206 failed to capture. For example, secondary headset 206 may notify primary headset 204 that secondary headset 206 failed to capture data packet Y. Further, in this example, primary headset 204 may transmit data packet Y to secondary headset 206

Continuing with the example wherein data packets X, Y, and Z were sent from media source 202 to primary headset 204, and secondary headset 206 was only able to capture data packets X and Z, secondary headset 206 may (e.g., upon capturing packets X and Z) associate data packet X with a timeslot T0 and data packet Z with a timeslot T2. Further, upon receipt of data packet Y from primary headset 204, secondary headset 206 may associate data packet Y with a timeslot T1. In some embodiments, upon receipt of data packet Y from primary headset 204, secondary headset 206 may determine, via a packet header of data packet Y, that data packet Y is associated with timeslot T1. For example, the packet header of data packet Y may identify a timeslot for data packet Y and/or a data packet that was sent immediately prior to data packet Y and/or immediately after data packet Y. Further, in at least some embodiments, setup information, as disclosed above, may include information regarding rules and/or protocols for identifying timeslots of missed packets.

Figure 3:
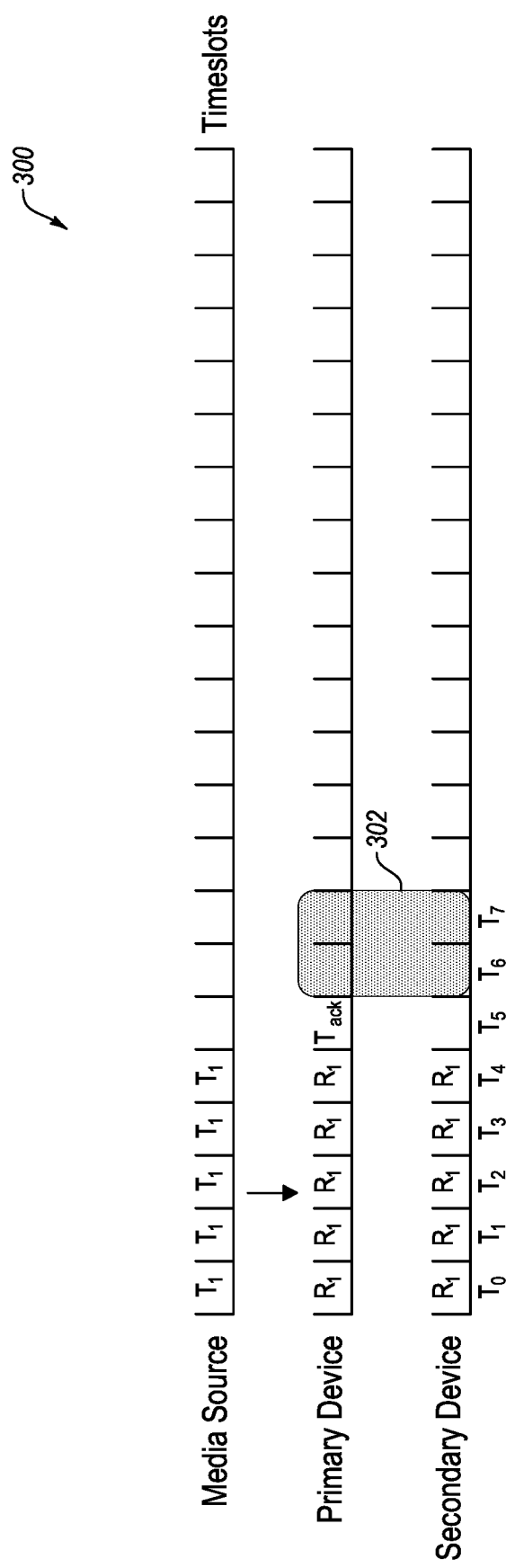
FIG. 3 is an example timing diagram for a multi-device media system, according to one or more embodiments of the disclosure.

FIG. 3 is a timing diagram 300 of a multi-device media system, such as multi-device media system 200 shown in FIG. 2. As shown in FIG. 3, a media source (e.g., media source 202 of FIG. 2) may transmit data packets to a primary device (e.g., primary headset 204 of FIG. 2) during a first time duration (e.g., during timeslots $T_0$-$T_4$). Further, during the first time duration (e.g., during timeslots $T_0$-$T_4$), a secondary device (e.g., secondary headset 206 of FIG. 2) may capture (e.g., via sniffing) the data packets sent from the media source to the primary device. Moreover, in some embodiments, the primary device and the secondary device may communicate (e.g., during one or more timeslots, such as timeslots $T_6$ and $T_7$) to identify which packets, if any, were not captured ("missed") by the secondary device. Compared to a relay system (e.g., as described with reference to timing diagram 100 of FIG. 1), a number of utilized timeslots is reduced.

Figure 4A:
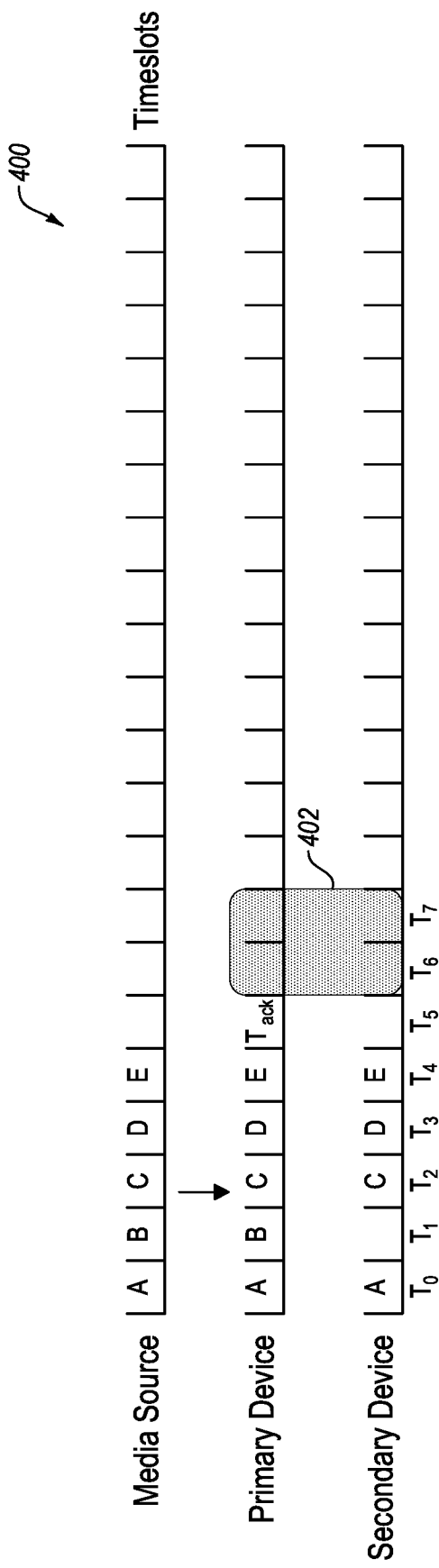
FIG. 4A is an example timing diagram for a multi-device media system prior to compensating for a missed data packet.
Figure 4B:
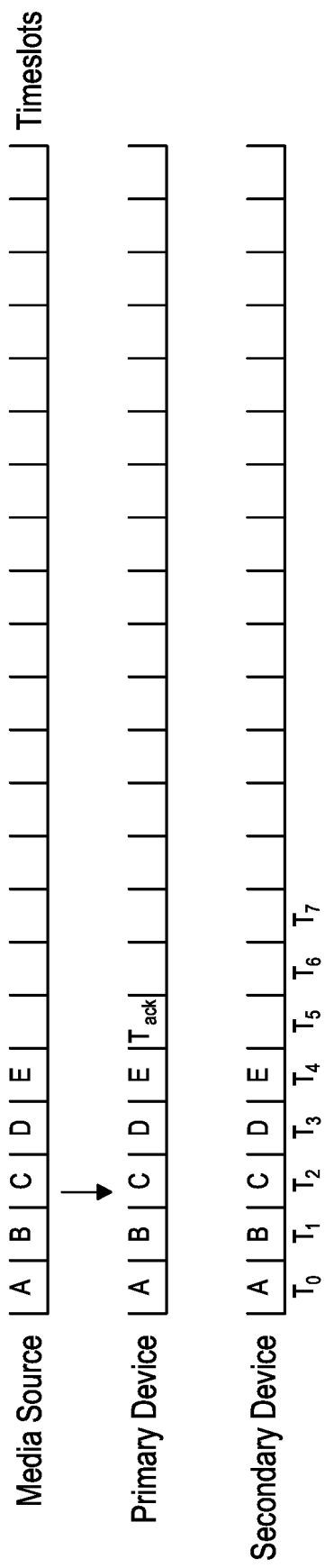
FIG. 4B is an example timing diagram for an example multi-device media system after compensating for a missed data packet, according to one or more embodiments of the disclosure.

As noted herein, a secondary device (e.g., secondary headset 206 of FIG. 2) may be configured to receive a previously missed data packet from a primary device (e.g., media source 202 of FIG. 2). Further, the secondary device may be configured to associate the previously missed data packet with a previously unassociated timeslot. More specifically, for example, the secondary device may be configured to insert missing audio content of the previously missed data packet into a timeslot before the audio content is decoded and played. For example, as shown in a timing diagram 400 of FIG. 4A, the primary device may receive data packets A, B, C, D, and E, during respective timeslots $T_0$, $T_1$, $T_2$, $T_3$, and $T_4$. Moreover, in this example, the secondary device may capture data packet A during timeslot $T_0$, data packet C during timeslot $T_2$, data packet D during timeslot $T_3$, and data packet E during timeslot $T_4$. However, as illustrated in FIG. 4A, in this example, the secondary device failed to capture data packet B, which was transmitted from the media source to the primary device during timeslot $T_1$. Continuing with this example, after the missed data packet B is identified (e.g., via the primary device and/or the secondary device during, for example, a communication period 402 during timeslots $T_6$ and $T_7$) and sent to the secondary device, the secondary device may associate missed data packet B with a previously unassociated timeslot $T_1$, as shown in a timing diagram 410 of FIG. 4B.

Figure 5A:
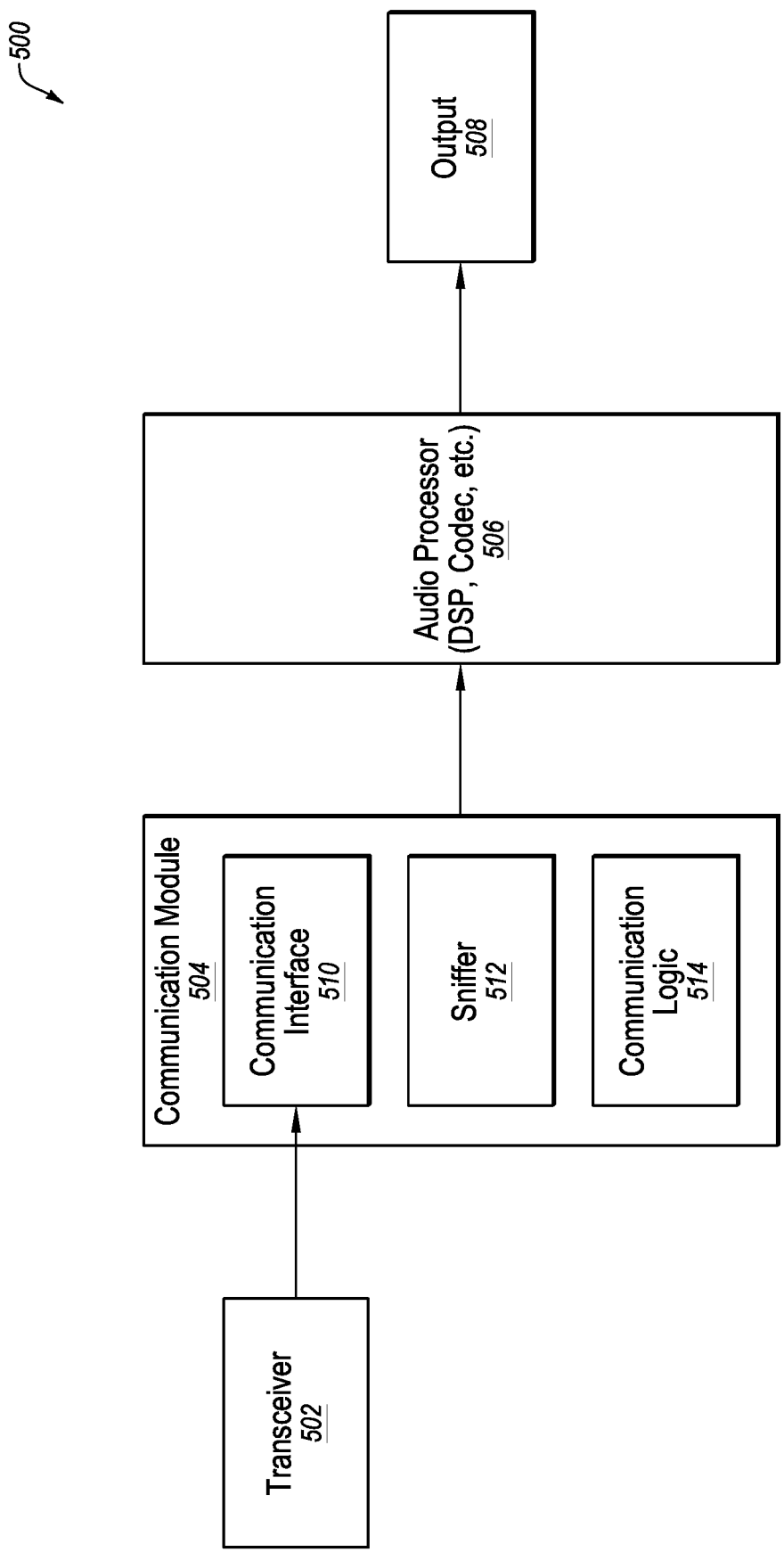
FIG. 5A is a block diagram of an example device including a transceiver, a communication module, and a processor, according to various embodiments of the disclosure.

FIG. 5A illustrates a device 500 including a transceiver 502, a communication module 504, and a processor 506 (e.g., digital signal processor (DSP, codec, etc.), which may be configured to convey an output 508 (e.g., an audio output). Communication module 504 may include a communication interface 510, a sniffer 512, and communication logic 514. According to various embodiments, device 500, which may include a secondary device, such as secondary headset 206 of FIG. 2, may be configured (e.g., programmed) to implement the techniques for compensating for missed data packets, according to various embodiments of the disclosure.

Figure 5B:
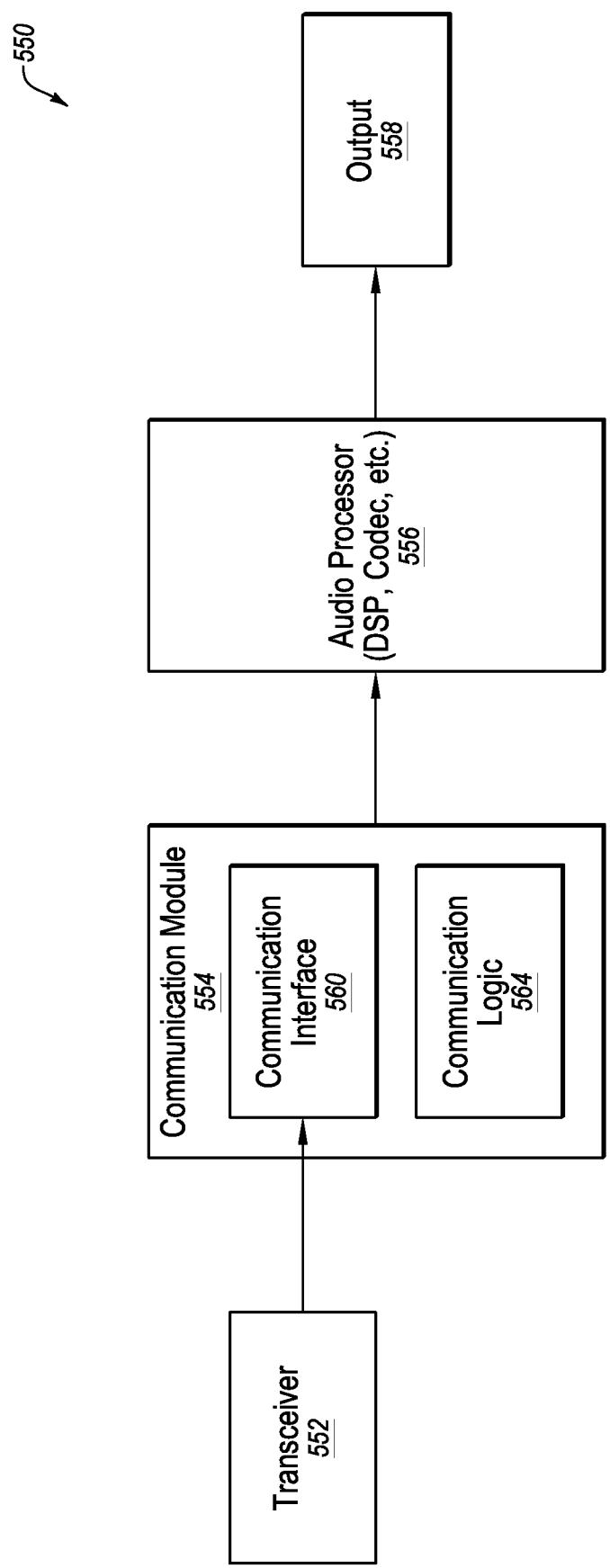
FIG. 5B is a block diagram of another example device including a transceiver, a communication module, and a processor, in accordance with various embodiments of the disclosure.

Further, FIG. 5B illustrates a device 550 including a transceiver 552, a communication module 554, and a processor 556 (e.g., digital signal processor (DSP, codec, etc.), which may be configured to convey an output 558 (e.g., an audio output). Communication module 554 may include a communication interface 560 and communication logic 564. According to various embodiments, device 550, which may include a primary device, such as primary headset 204 of FIG. 2, may be configured (e.g., programmed) to implement the techniques for compensating for missed data packets, according to various embodiments of the disclosure.

In some embodiments, device 550 may operate in a polled mode where it reconciles the data packets received at device 500 (e.g., via sniffing) to the data packets received at device 550, and if there is a discrepancy, device 550 may send the missed data packets to device 500 in a reply message. Further, in these and other embodiments, device 550 may send (e.g., in a relay mode) any missed data packets to device 500 in more than one package, and device 500 may reassemble the received packages into a larger package. For example, instead of sending a 64 byte package to device 500, device 550 may send two 32 byte packages to device 500, which may reassemble the two 32 byte packages into a larger, 64 byte package.

In at least some embodiments, device 550 and device 500 may operate in a central-peripheral arrangement. In these embodiments, device 550 may be configured to receive notifications from device 500, including notifications related to data packets missed by device 500, and device 550 may send missing data packets to device 500 responsive to the notifications.

With reference to FIGS. 5A and 5B, each of communication interface 510 and communication interface 560 may be configured for communication according to one or more topologies, such as, BLUETOOTH®. For example, communication interfaces 510 and 560 may enable for communication between devices 500 and 550. Further, communication interface 510 may enable device 500 to communicate with (e.g., transmit to and receive from) a media source (e.g., media source 202 of FIG. 2), and communication interface 560 may enable device 550 to communicate with (e.g., transmit to and receive from) a media source (e.g., media source 202 of FIG. 2).

Sniffer 512 of device 500 may be configured to use communication interface 510 to monitor data packet traffic between a media source (e.g., media source 202 of FIG. 2) and a primary device (e.g., device 550 of FIG. 5B). In some embodiments, sniffer 512 may be configured to capture data packets sent using the topology of the communication link between device 550 and the media source.

Communication logic 514 may include a firmware application executed by a microprocessor, for example, as part of a code store of a microcontroller. In at least one embodiment, communication logic 514 may be configured to monitor the data packets received at sniffer 512 and may periodically request that device 550 and/or device 500 determine if a data packet was missed by sniffer 512. More specifically, in some embodiments, communication logic 514 may periodically notify device 550 of which packets were captured via sniffer 512, and request device 550 determine if a data packet was missed by sniffer 512. In other embodiments, communication logic 514 may request a list of data packets received at device 550, and communication logic 514 may compare the list of data packets received at device 550 to a list of data packets captured via sniffer 512. For example, communication logic 514 may be configured to compare data packets received at device 550 to a log identifying data packets that were sent from the audio source to device 550 and captured by sniffer 512. Based on the comparison, one or more missed data packets may or may not be identified. Further, according to various embodiments, communication logic 514 may be configured to request any identified missed audio packets from device 550.

Communication logic 564 may include a firmware application executed by a microprocessor, for example, as part of a code store of a microcontroller. According to various embodiments, communication logic 564 may be configured to generate and/or maintain a log of data packets transmitted from a media source and received at device 550. In some embodiments, communication logic 564 may be configured to transmit the log to device 500. Further, communication logic 564 may be configured to receive information indicative of which packets transmitted by the media source were captured at device 500, and determine which transmitted packets, if any, were missed by device 500. Moreover, in response to identifying one or more missed packets, communication logic 564 may be configured to transmit compensation information related to the one or more missed packets to device 500. The compensation information may include, for example, identification of the one or more missed data packets, content (e.g., media content) associated with the one or more missed data packets, and/or the one or more missed data packets.

Figure 6:
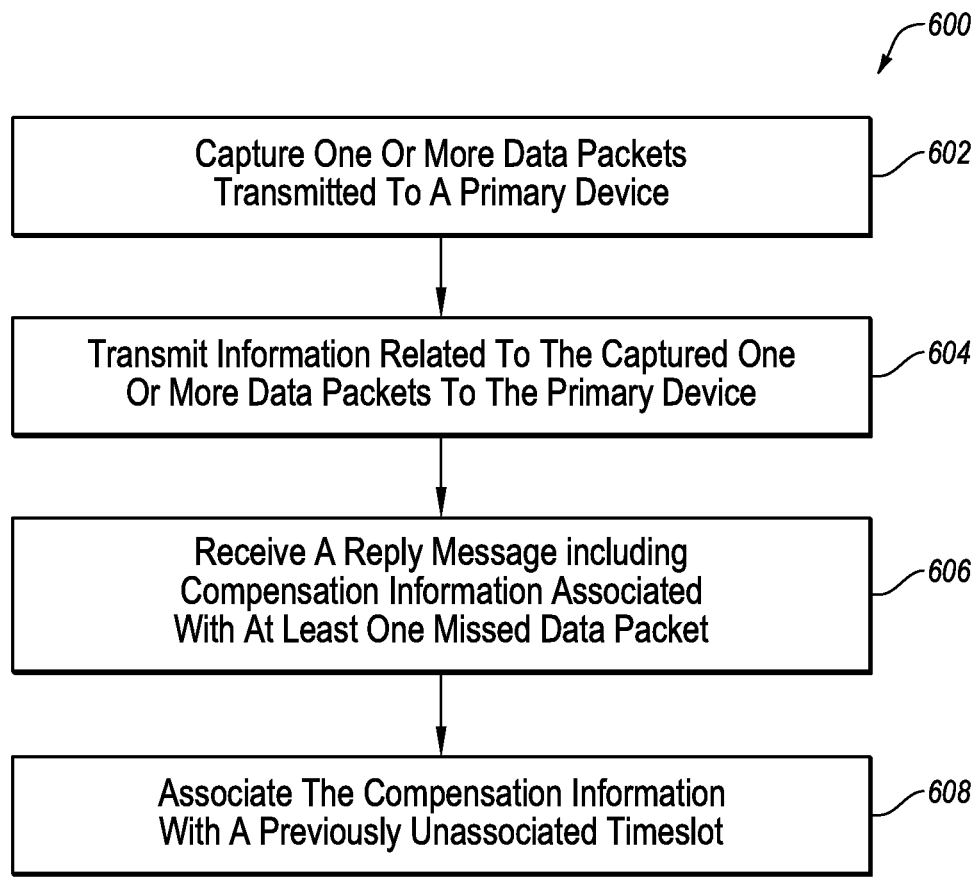
FIG. 6 is a flowchart of an example method for compensating for missed packets in a multi-device media system, according to one or more embodiments of the disclosure.

FIG. 6 is a flowchart of an example method 600 for compensating for missed data packets in a multi-device media system. Method 600 may be performed by any suitable system, apparatus, or device. For example, a secondary device, such as secondary headset 206 (see FIG. 2) or one or more of the components thereof, may perform one or more of the operations associated with method 600. In these and other embodiments, program instructions stored on a computer readable medium may be executed to perform one or more of the operations of method 600.

At block 602, one or more data packets transmitted to a primary device over a first communication link may be captured, and method 600 may proceed to block 604. For example, the one or more data packets, which may be transmitted from a media source (e.g., media source 202 of FIG. 2) to a primary device (e.g., primary headset unit 204 of FIG. 2) via the first communication link (e.g., communication link 208 of FIG. 2) may be captured by a secondary device (e.g., secondary headset unit 206 of FIG. 2). More specifically, for example, the one or more data packets sent from the audio source to the primary device may be captured via a sniffer (e.g., sniffer 512 of FIG. 5A) of the secondary device.

At block 604, information related to the captured data packets may be transmitted to the primary device, and method 600 may proceed to block 606. For example, the information ("reporting information") may identify which one or more data packets were captured by the secondary device and/or which one or more data packets were missed by the secondary device. For example, reporting information about the captured data packets may be transmitted from the secondary device (e.g., secondary headset unit 206 of FIG. 2) to the primary device (e.g., primary headset unit 204 of FIG. 2) via a second communication link (e.g., communication link 210 of FIG. 2).

At block 606, a reply message including compensation information associated with at least one missed data packet may be received, and method 600 may proceed to block 608. For example, the reply message, which may be sent from the primary device (e.g., primary headset unit 204 of FIG. 2), may be received at the secondary device (e.g., secondary headset unit 206 of FIG. 2). For example, the compensation information may identify one or more missed data packets. Alternatively or additionally, the compensation information may include the at least one missed data packet and/or content associated with the at least one missed data packet.

At block 608, the compensation information may be associated with a previously unassociated timeslot. More specifically, for example, audio content of a missed data packet may be associated with a previously unassociated timeslot prior to decoding and playing the audio content. For example, the previously unassociated timeslot may include one of a plurality of timeslots, wherein other timeslots of the plurality may be previously associated with previously captured data packets.

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, one or more relayed data packets transmitted from the primary device (e.g., primary headset unit 204 of FIG. 2) may be received at the secondary device (e.g., secondary headset unit 206 of FIG. 3) via the second communication link (e.g., communication link 210 of FIG. 2). In addition, for example, information identifying data packets transmitted from the media source to the primary device may be transmitted to the secondary device. Further, for example, information identifying one or more missed packets may be sent to the primary device. Moreover, setup information, which may enable the secondary device to listen to messages (e.g., air packets) that are communicated between the media source and primary device may be received by the secondary device. For example, the setup information may be transmitted by the media source and/or the primary device. In addition, the secondary device may communicate (e.g., via communication link 212 and/or communication links 208 and 210; see FIG. 2)) with the media source (e.g., to identify the secondary device to the media source and/or its intent to sniff data packets transmitted from the media source).

Figure 7:
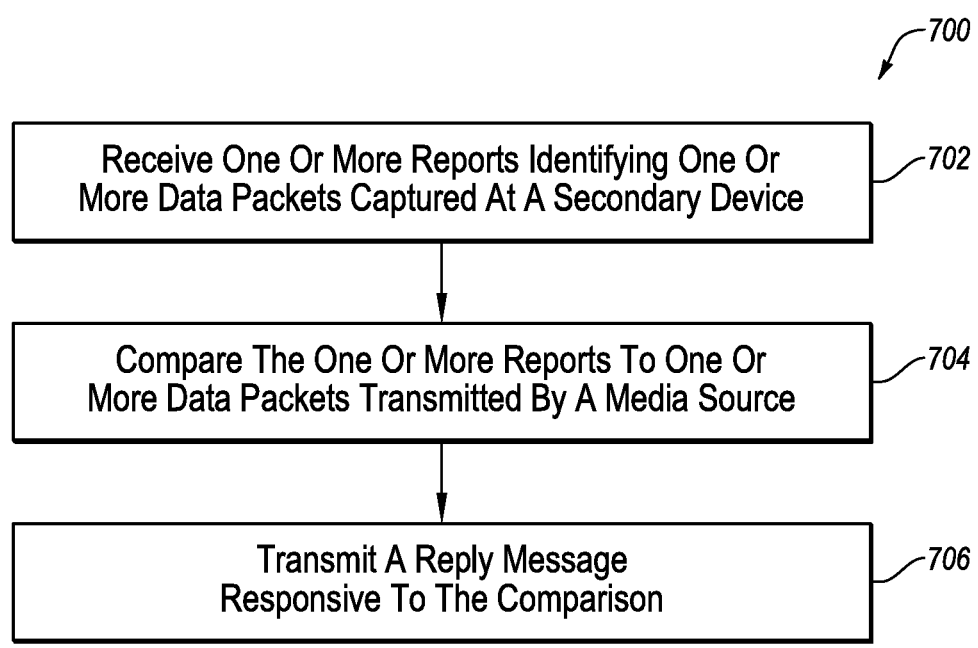
FIG. 7 is a flowchart of an example method for assisting a secondary device of a multi-device media system to compensate for missed data packets, according to one or more embodiments of the disclosure.

FIG. 7 is a flowchart of an example method 700 for assisting a secondary device to compensate for missed data packets. Method 700 may be performed by any suitable system, apparatus, or device. For example, a primary device, such as primary headset 204 (see FIG. 2) or one or more of the components thereof, may perform one or more of the operations associated with method 700. In these and other embodiments, program instructions stored on a computer readable medium may be executed to perform one or more of the operations of method 700.

At block 702, one or more reports identifying one or more data packets captured at a secondary device may be received, and method 700 may proceed to block 704. For example, the one or more reports, which may be generated and/or sent by the secondary device (e.g., secondary headset 206 of FIG. 2), may be received at a primary device (e.g., primary headset 204 of FIG. 2).

At block 704, the one or more reports may be compared to one or more data packets transmitted by a media source, and method 700 may proceed to block 706. More specifically, for example, the one or more data packets transmitted by a media source and received at the primary device may be compared to the one or more data packets identified in the one or more reports generated and/or sent by the secondary device. Yet more specifically, the primary device may compare a log identifying data packets (e.g., via packet header information) received at the primary device to data packets captured by the secondary device.

At block 706, a reply message responsive to the comparison may be transmitted. More specifically, for example, in response to comparing the one or more data packets transmitted by the media source and received at the primary device to the one or more data packets identified in the one or more reports, the reply message may be transmitted. For example, the reply message may include compensation information that may indicate that at least one packet was missed. Alternatively or additionally, the compensation information may identify the at least one missed packet, and/or include the at least one missed packet.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, a log identifying data packets received at the primary device may be generated and/or maintained by the primary device. Furthermore, setup information, which may enable the secondary device to listen to messages (e.g., wireless data packets) that are communicated between the media source and primary device, may be transmitted to the secondary device. Moreover, notification information, which may include information identifying the secondary headphone device and an intent of the secondary headphone device to sniff data packets transmitted by the media source, may be received by the primary device and transmitted to the media source.

One of ordinary skill in the art would recognize that the wireless communication described with reference the various embodiments may be performed using many topologies, including BLUETOOTH®, BLUETOOTH® Low Energy, ZIGBEE®, and WiFi. Also, one of ordinary skill in the art will recognize that the principles described in this disclosure are applicable to other personal area network technologies, for example, induction wireless, infrared wireless, and ultra-wideband. One of ordinary skill in the art would recognize that the disclosure is not limited to audio, and applies to media content, generally, including multi-media content.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: a secondary headphone device, comprising: one or more communication interfaces configured to communicate with a primary headphone device over a first wireless communication link; a sniffer configured to capture one or more data packets communicated from a media source to the primary headphone device over a second wireless communication link; and communication logic configured to: provide reporting information about the one or more captured data packets to the primary headphone device via the first wireless communication link; and receive one or more reply messages from the primary headphone device via the first wireless communication link, the one or more reply messages indicating whether or not the sniffer captured each data packet communicated from the media source to the primary headphone device.

Embodiment 2: the secondary headphone device of Embodiment 1, wherein the one or more reply messages indicates at least one data packet was missed, the one or more reply messages comprising compensation information for the at least one missed data packet.

Embodiment 3: the secondary headphone device of any of Embodiments 1 and 2, wherein the communication logic is further configured to associate at least some of the compensation information with a previously unassociated timeslot.

Embodiment 4: the secondary headphone device of any of Embodiments 1 to 3, wherein the previously unassociated timeslot is one of a plurality of time slots, and at least one of the plurality of time slots is associated with the one or more data packets captured via the sniffer.

Embodiment 5: the secondary headphone device of any of Embodiments 1 to 4, wherein the compensation information comprises the at least one missed data packet.

Embodiment 6: the secondary headphone device of any of Embodiments 1 to 5, wherein the compensation information comprises media content associated with the at least one missed data packet.

Embodiment 7: the secondary headphone device of any of Embodiments 1 to 6, wherein the communication logic is further configured to: receive information identifying one or more data packets received by the primary device; and compare the one or more data packets captured via the sniffer to the one or more data packets received by the primary headphone device.

Embodiment 8: a method of compensating for missed packets in a multi-speaker media system, comprising: capturing, via a first headphone device, one or more data packets communicated over a first wireless communication link between a media source and a second, different headphone device; sending reporting information about the one or more captured data packets from the first headphone device to the second, different headphone device over a second wireless communication link; receiving, at the first headphone device and via the second wireless communication link, a reply message from the second, different headphone device that includes compensation information associated with at least one data packet missed by the first headphone device; and associating, at the first headphone device, the compensation information with a previously unassociated timeslot.

Embodiment 9: the method of Embodiment 8, wherein receiving the reply message comprises receiving the reply message including at least one of media content associated with the at least one missed data packet and the at least one missed data packet.

Embodiment 10: the method of any of Embodiments 8 and 9, wherein capturing the one or more data packets comprises capturing the one or more data packets via a sniffer of the first headphone device.

Embodiment 11: the method of any of Embodiments 8 to 10, wherein sending reporting information about the one or more captured data packets to the second, different headphone device comprises sending the reporting information about the one or more captured data packets to the second, different headphone device via a wireless communication link.

Embodiment 12: the method of any of Embodiments 8 to 11, further comprising receiving setup information from the second, different headphone device to enable the one or more data packets communicated over the first wireless communication link between the media source and the second, different headphone device to be captured by the first headphone device.

Embodiment 13: the method of any of Embodiments 8 to 12, further comprising comparing data packets transmitted from the media source to second, different headphone device to the one or more captured data packets to identify the at least one data packet missed by the first headphone device.

Embodiment 14: a secondary headphone device, comprising: one or more communication interfaces configured to receive relayed data packets from a primary headphone device over a first wireless communication link; a sniffer configured to capture one or more data packets communicated from a media source to the primary headphone device over a second wireless communication link; and communication logic configured to: identify one or more missed data packets; provide reports about the one or more missed data packets to the primary headphone device; and receive reply messages from the primary headphone device, the reply messages comprising compensation information corresponding to the one or more missed data packets.

Embodiment 15: the secondary headphone device of Embodiment 14, wherein the compensation information comprises at least one missed data packet of the one or more missed data packets.

Embodiment 16: the secondary headphone device of any of Embodiments 14 and 15, wherein the compensation information comprises media content associated with at least one missed data packet of the one or more missed data packets.

Embodiment 17: the secondary headphone device of any of Embodiments 14 to 16, wherein the communication logic is further configured to compare the captured data packets to the relayed data packets and identify the one or more missed data packets responsive to the comparison.

Embodiment 18: the secondary headphone device of any of Embodiments 14 to 17, wherein the communication logic is further configured to receive setup information from the primary headphone device to enable the sniffer to capture the one or more data packets.

Embodiment 19: the secondary headphone device of any of Embodiments 14 to 18, wherein the communication logic is further configured to maintain a log identifying the one or more captured data packets.

Embodiment 20: the secondary headphone device of any of Embodiments 14 to 19, wherein the communication logic is further configured to transmit notification information to the media source, the notification information identifying the secondary headphone device and an intent of the secondary headphone device to sniff data packets transmitted by the media source.

Embodiment 21: a primary headphone device, comprising: one or more communication interfaces configured to communicate with a secondary headphone device and a media source over a first wireless communication link and a second wireless communication link, respectively; and communication logic configured to: receive reports about data packets captured by the secondary headphone device; compare the reports to data packets received from the audio source; and send a reply message to the secondary headphone device responsive to the comparison.

Embodiment 22: the primary headphone device of Embodiment 21, wherein the communication logic is further configured to identify one or more missed data packets responsive to the comparison, wherein the reply message comprises compensation information that corresponds to the identified one or more missed data packets.

Embodiment 23: the primary headphone device of any of Embodiments 21 and 22, wherein the compensation information comprises the one or more missed data packets.

Embodiment 24: the primary headphone device of any of Embodiments 21 to 23, wherein the compensation information comprises content associated with the one or more missed data packets.

Embodiment 25: a method of assisting a secondary headphone device to compensate for missed data packets in a multi-speaker system, comprising: receiving reports about captured data packets from a secondary headphone device; comparing the reports to data packets received from a media source; and sending a reply message to the secondary headphone device responsive to the comparison.

Embodiment 26: the method of Embodiment 25, further comprising: identifying one or more missed data packets responsive to the comparison; and adding content to the reply message, wherein the content corresponds to content of the identified one or more missed data packets.

Embodiment 27: a method of compensating for missed packets, comprising: receiving one or more relayed data packets from a primary headphone device over a first wireless communication link; capturing one or more data packets communicated over a second wireless communication link between a media source and the primary headphone device; identifying one or more missed data packets; sending one or more reports about the identified missed data packets to the primary headphone device; receiving one or more reply messages from the primary headphone device that include compensation information associated with the one or more missed data packets; and associating the compensation information with a previously unassociated timeslot.

Embodiment 28: a primary headphone device, comprising: a first communication interface configured to receive data packets from a media source over a first wireless communication link; a second communication interface configured to relay one or more of the received data packets to a secondary headphone device over a second wireless communication link; and communication logic configured to: receive a report indicating that at least one relayed data packet of the relayed data packets was not received at the secondary headphone device; and transmitting the at least one relayed data packet to the secondary device.

Embodiment 29: a pair of audio modules, comprising: a first module configured to receive data packets from an audio source over a first communication link; and a second module configured to capture at least some of the data packets sent over the first communication link and compensate for missed data packets using information sent by the first module.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A primary headphone device, comprising:
one or more communication interfaces configured to communicate with an audio source and a secondary headphone device; and
communication logic configured to:
transmit information to the secondary headphone device identifying one or more data packets received by the primary headphone device;
receive reporting information identifying one or more data packets missed by the secondary headphone device; and
transmit compensation information for the one or more data packets missed by the secondary headphone device.

2. The primary headphone device of claim 1, wherein the communication logic is further configured to transmit setup information to the secondary headphone device to enable the secondary headphone device to capture data packets transmitted from the audio source to the primary headphone device.

3. The primary headphone device of claim 2, wherein the communication logic is further configured to receive information from the secondary headphone device identifying at least one data packet captured by the secondary headphone device.

4. The primary headphone device of claim 3, wherein the communication logic is further configured to compare the information identifying the at least one data packet captured by the secondary headphone device to the information identifying the one or more data packets received by the primary headphone device.

5. The primary headphone device of claim 4, wherein the communication logic is further configured to, in response to the comparison, transmit one or more messages to the secondary headphone device indicating whether or not the secondary headphone device missed at least one data packet of the one or more data packets received by the primary headphone device.

6. The primary headphone device of claim 1, wherein the compensation information comprises at least one missed data packet of the one or more data packets missed by the secondary headphone device.

7. The primary headphone device of claim 1, wherein the compensation information comprises media content associated with the one or more data packets missed by the secondary headphone device.

8. A method, comprising:
receiving, at a first headphone device, one or more data packets transmitted from a media source over a first wireless communication link;
transmitting, from the first headphone device to a second headphone device, information identifying the one or more data packets received by the first headphone device;
receiving, at the first headphone device, reporting information identifying at least one data packet received by the first headphone device and missed by the second headphone device; and
transmitting, from the first headphone device to the second headphone device, a reply message that includes compensation information associated with the at least one data packet missed by the second headphone device.

9. The method of claim 8, further comprising capturing, via a sniffer at the second headphone device, a number of data packets of the one or more data packets transmitted from the media source over the first wireless communication link.

10. The method of claim 9, further comprising comparing, via the second headphone device, the information identifying the one or more data packets received by the first headphone device to identifying information regarding the number of captured data packets to identify the at least one data packet received by the first headphone device and missed by the second headphone device.

11. The method of claim 10, further comprising generating, at the second headphone device, the reporting information based one the identification of the at least one data packet received by the first headphone device and missed by the second headphone device.

12. The method of claim 11, further comprising sending the reporting information from the second headphone device to the first headphone device.

13. The method of claim 8, further comprising transmitting setup information from the first headphone device to enable the one or more data packets transmitted from the media source over the first wireless communication link to be captured by the second headphone device.

14. The method of claim 8, wherein transmitting the reply message comprises transmitting the reply message including media content associated with the at least one data packet missed by the second headphone device.

15. A primary headphone device, comprising:
one or more communication interfaces configured to communicate with an audio source via a first communication link and a secondary headphone device via a second communication link; and
communication logic configured to:
receive, over the first communication link, one or more data packets;
transmit, over the second communication link, information identifying the one or more data packets received by the primary headphone device;
receive, over the second communication link, information identifying at least one data packet missed by the secondary headphone device; and
transmit, over the second communication link, the at least one data packet missed by the secondary headphone device.

16. The primary headphone device of claim 15, wherein the communication logic is further configured to transmit, over the second communication link, compensation information associated with the at least one data packet missed by the secondary headphone device.

17. The primary headphone device of claim 16, wherein the compensation information comprises media content associated with the at least one data packet missed by the secondary headphone device.

18. The primary headphone device of claim 15, wherein the communication logic is further configured to transmit setup information via the first communication link, the second communication link, or both, to enable the secondary headphone device to capture data packets transmitted over the first communication link.

19. The primary headphone device of claim 15, wherein the communication logic is further configured to receive, via the second communication link, a request for the information identifying the one or more data packets received by the primary headphone device.

20. The primary headphone device of claim 15, wherein the communication logic is further configured to:

maintain a log of the one or more data packets received over the first communication link; and
transmit the log over the second communication link.

\* \* \* \* \*